(12) United States Patent
Buchanan et al.

(10) Patent No.: US 6,887,184 B2
(45) Date of Patent: May 3, 2005

(54) METHOD OF CONTROLLING A DUAL CLUTCH TRANSMISSION

(75) Inventors: Mark Buchanan, Rochester Hills, MI (US); Melissa Koenig, Howell, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/634,239

(22) Filed: Aug. 5, 2003

(65) Prior Publication Data

US 2004/0166991 A1 Aug. 26, 2004

Related U.S. Application Data

(63) Continuation-in-part of application No. 10/371,381, filed on Feb. 21, 2003, now Pat. No. 6,832,978.

(51) Int. Cl.[7] .......................... B60K 41/02; G06F 17/00; G06F 19/00; G06F 7/00
(52) U.S. Cl. ........................ 477/174; 477/181; 477/180; 701/66; 701/67
(58) Field of Search ................................. 477/180–181, 477/174, 176; 701/66–68; 74/330, 335

(56) References Cited

U.S. PATENT DOCUMENTS

| 3,589,483 A | | 6/1971 | Smith ........................ 192/3.52 |
| 4,461,188 A | | 7/1984 | Fisher ........................ 74/330 |
| 4,513,631 A | | 4/1985 | Koivunen .................... 74/360 |
| 4,544,057 A | | 10/1985 | Webster et al. .......... 192/0.076 |
| 4,790,418 A | * | 12/1988 | Brown et al. ................. 701/51 |
| 4,827,784 A | | 5/1989 | Muller et al. ................. 74/330 |
| 5,259,476 A | * | 11/1993 | Matsuno et al. ............ 180/197 |
| 5,609,067 A | * | 3/1997 | Mitchell et al. .......... 74/336 R |
| 5,634,867 A | * | 6/1997 | Mack ............................ 477/86 |
| 5,662,198 A | | 9/1997 | Kojima et al. ........... 192/87.11 |
| 5,711,409 A | | 1/1998 | Murata ..................... 192/87.11 |
| 5,720,203 A | | 2/1998 | Honda et al. .................. 74/325 |
| 5,890,392 A | | 4/1999 | Ludanek et al. .............. 74/331 |
| 5,915,512 A | | 6/1999 | Adamis et al. ............. 192/3.61 |
| 5,950,781 A | | 9/1999 | Adamis et al. ............. 192/3.61 |
| 5,966,989 A | | 10/1999 | Reed, Jr. et al. .............. 74/331 |
| 5,979,257 A | | 11/1999 | Lawrie ........................ 74/335 |
| 6,006,620 A | | 12/1999 | Lawrie et al. ................ 74/335 |
| 6,012,561 A | | 1/2000 | Reed, Jr. et al. ........... 192/48.2 |
| 6,044,719 A | | 4/2000 | Reed, Jr. et al. .............. 74/330 |
| 6,171,212 B1 | * | 1/2001 | Reuschel ...................... 477/86 |
| 6,286,381 B1 | | 9/2001 | Reed, Jr. et al. .............. 74/336 |
| 6,364,809 B1 | | 4/2002 | Cherry ........................ 477/86 |
| 6,415,213 B1 | * | 7/2002 | Hubbard et al. .............. 701/51 |
| 6,536,296 B2 | * | 3/2003 | Sakamoto et al. ............ 74/325 |
| 6,715,597 B1 | * | 4/2004 | Buchanan et al. ....... 192/70.12 |

FOREIGN PATENT DOCUMENTS

GB  2 036 203  11/1980

* cited by examiner

*Primary Examiner*—Tisha Lewis
(74) *Attorney, Agent, or Firm*—Bliss McGlynn, P.C.; Grey Dziegielewski (57) ABSTRACT

A method of controlling the clutches of a dual clutch transmission during a two-gear positive downshift, wherein the first clutch drives an initial gear and the final gear and the second clutch drives an intermediate gear. The torque transfer across each clutch is controlled so that the torque output of the transmission will be linearly changed over from the first clutch to the second clutch to cause the engine to track a target engine speed profile. The method changes over the gears driven by the first clutch from the initial gear to the final gear as the engine continues to tracks the target speed. The torque transfer across each clutch is controlled so that the torque output will be linearly changed back from the second clutch to the first clutch in an inversely proportional rate to continue to cause the engine to track the target engine speed profile.

5 Claims, 5 Drawing Sheets

METHOD OF CONTROLLING A DUAL CLUTCH TRANSMISSION

This application is a continuation-in-part of U.S. Ser. No. 10/371,381, entitled Method Of Controlling A Dual Clutch Transmission filed Feb. 21, 2003, now U.S. Pat. No. 6,832,978.

BACKGROUND OF THE INVENTION

1. Field of the Invention

The present invention relates, generally to a method of controlling a dual clutch transmission and, more specifically, to a method for automatically controlling a positive torque downshift across two-gears by controlling the torque transfer of the clutches of a dual clutch transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. Manual transmissions are relatively simple and robust and provide good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second, and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts under load conditions. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and cooperatively configured so as to derive power input from a single engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electro-mechanical type, since the lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals have not been achievable in the past. There are a large number of events to properly time and execute within the transmission for each shift to occur smoothly and efficiently. Conventional control schemes and methods have generally failed to provide this capability. Accordingly, there exists a need in the related art for better methods of controlling the operation of dual clutch transmissions.

One particular area of control improvement that is needed is in the power-shifting of the dual clutch transmission. As discussed above, power shifting is actually the automatic gear shifting process of the dual clutch transmission. The nature of the dual clutch transmission requires accurate control of the clutch engagement and thus the torque transferred across them during the gear shifting process. More specifically, it is desirable to operate the clutches of the dual clutch transmission so that the automatic gear shifting process is smoothly and efficiently controlled by varying the amount of torque transferred across each clutch as the clutch driving the off-going gear is minimized and the clutch driving the on-coming clutch is maximized.

Control of the torque transferred across the clutches during the gear shifting process is required to provide smooth operation, avoid hard or noticeable lockup of the on-coming clutch to the transmission, and to provide efficient engine-to-transmission interaction during either upshifts or downshifts. The prior art dual transmission clutch control schemes are incapable of adequately providing for fine control of clutch torque transfer to satisfy this need. Current control methods do have the general capability to operate the clutches as needed. However, they lack the ability to finely control the torque transferred across the clutches to achieve the high degree of accuracy needed for smooth shifting between the gears of the transmission. Additionally, current control methods for the clutches of a dual clutch transmission generally concern themselves with simple engagement and disengagement of the clutch assemblies and fail to adequately provide for the corresponding control of all aspects of the shift process including engine speed control during the shift and the differences in upshifting and downshifting.

In that regard, some prior control methods for the gear shifting of dual clutch transmissions have attempted to overcome these inadequacies by using a control algorithm. For example, one known method provides an algorithm to control the movement of electrical clutch actuators, and thus the engagement of the clutches, to prevent torque interruption during upshifts of a dual clutch transmission. While the application of this particular algorithm is functionally adequate for its intended use, it still has certain drawbacks that leave room for improvement.

Of particular note is the specific power downshift, also known as a positive torque downshift occurs during a downshift of two-gears. Generally speaking, a positive torque downshift event will most likely occur in a vehicle "accelerate to pass" condition. This is where the engine throttle position is originally set to either maintain a constant vehicle speed or to provide light acceleration but it then becomes desirable to rapidly accelerate to pass another vehicle. In this case, the engine throttle position will be maximized causing a commanded downshift to the next lower gear in an attempt to immediately increase the engine speed to place it in a higher torque generating RPM range.

In certain cases, due to the vehicle speed and a low positive torque output at the time the downshift is command, it will be necessary to downshift two-gears to achieve the desired speed increase as set by the new throttle position. This most often occurs when the dual clutch transmission is in its highest gear, typically the overdrive, which is the sixth gear in most examples of the dual clutch transmission. Thus, the two-gear positive torque downshift involves shifting from sixth to fourth gear in the dual clutch transmission. As mentioned above, the physical arrangement of the dual clutch is that the odd numbered gears are on one input shaft and the even numbered gears are on the other input shaft. This means that for the two-gear downshift event, conventional control algorithms must execute a first shift from six to fifth and then a shift from fifth to fourth. In other words, this causes the dual clutch transmission to move from engagement in sixth on the even numbered input shaft, to an engagement in fifth on the odd numbered input shaft, and then back to an engagement in fourth on the even numbered input shaft.

This is problematic in terms of a smooth ride and driveability for the current control methods. Since none of the current control methods provide for a smooth and efficient torque transfer from one clutch to the other in single gear shifts such that the shift and subsequent change in engine speed is smooth enough to go unnoticed by the driver, a two-gear downshift shift causes even greater disruption. More specifically, the two-gear positive torque downshift of the current control methods cause two distinct gear shifts, each with an accompanying abrupt change in vehicle speed.

Accordingly, there remains a need in the art for a method to operatively and actively control two-gear positive torque downshifts in a dual clutch transmission so that the downshift is efficiently and smoothly performed by providing control over the torque transfer of the clutches.

SUMMARY OF THE INVENTION

The disadvantages of the related art are overcome by the method of the present invention for controlling the engine speed of a vehicle having a dual clutch transmission. The method controls the torque transferred across each of the two clutches of a dual clutch transmission during a two-gear positive downshift, wherein the first of the two clutches drives an initial gear and the final gear and the second of the two clutches drives an intermediate gear. The method includes the steps of sensing the speed of the driven member of the first clutch in the initial gear, sensing the speed of the driven member of the second clutch in the intermediate gear, and estimating the speed of the driven member of the first clutch in the final gear and determining a clutch torque and slip profile for the changeover of the clutches. The method then determines a target engine speed profile based on the speed of the driven member of the first clutch, the speed of the driven member of the second clutch, the estimated speed of the driven member of the first clutch for the final gear, and the desired clutch torque/slip profile. The torque transfer across each clutch is simultaneously controlled so that the torque output of the transmission will be changed over from the first clutch to the second clutch by linearly decreasing the torque transferred across the first clutch while linearly increasing the torque transferred across the second clutch in an inversely proportional rate to follow the clutch torque and slip profile and to cause the engine to track the target engine speed profile.

When the first clutch is slipping at a greater rate than the second clutch the method changes over the gears driven by the first clutch by disengaging the synchronizer of the initial gear and engaging the synchronizer of the final gear as the engine continues to track the target speed. The method then simultaneously controls the torque transfer across each clutch so that the torque output of the transmission will be changed back from the second clutch to the first clutch by linearly decreasing the torque transferred across the second clutch while linearly increasing the torque transferred across the first clutch in an inversely proportional rate to continue to follow the clutch torque and slip profile and to cause the engine to continue to track the target engine speed profile. The method also continuously varies the pressure applied to the first clutch, once the first clutch is driving the final gear and is transferring all of the output torque to cause the engine to continue to track the target engine speed profile so that vehicle acceleration is maintained.

Thus, the method of the present invention controls the two-gear positive torque downshift of the dual clutch transmission by controlling the torque transfer across the clutches in such a manner as to maintain vehicle speed during the shift event. The method of the present invention thereby overcomes the inability of prior methods to control the engine and clutch speeds so that the speed and momentum of the vehicle are not interrupted. This is a substantial improvement over the prior methods of dual clutch shift control, which cause abrupt positive torque downshifts when required to downshift two gears. Thus, the shifts of the present invention are accomplished smoothly and efficiently so that there is no hard or distinctive "feel" to the downshift, thereby improving overall drivability and comfort of the vehicle.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
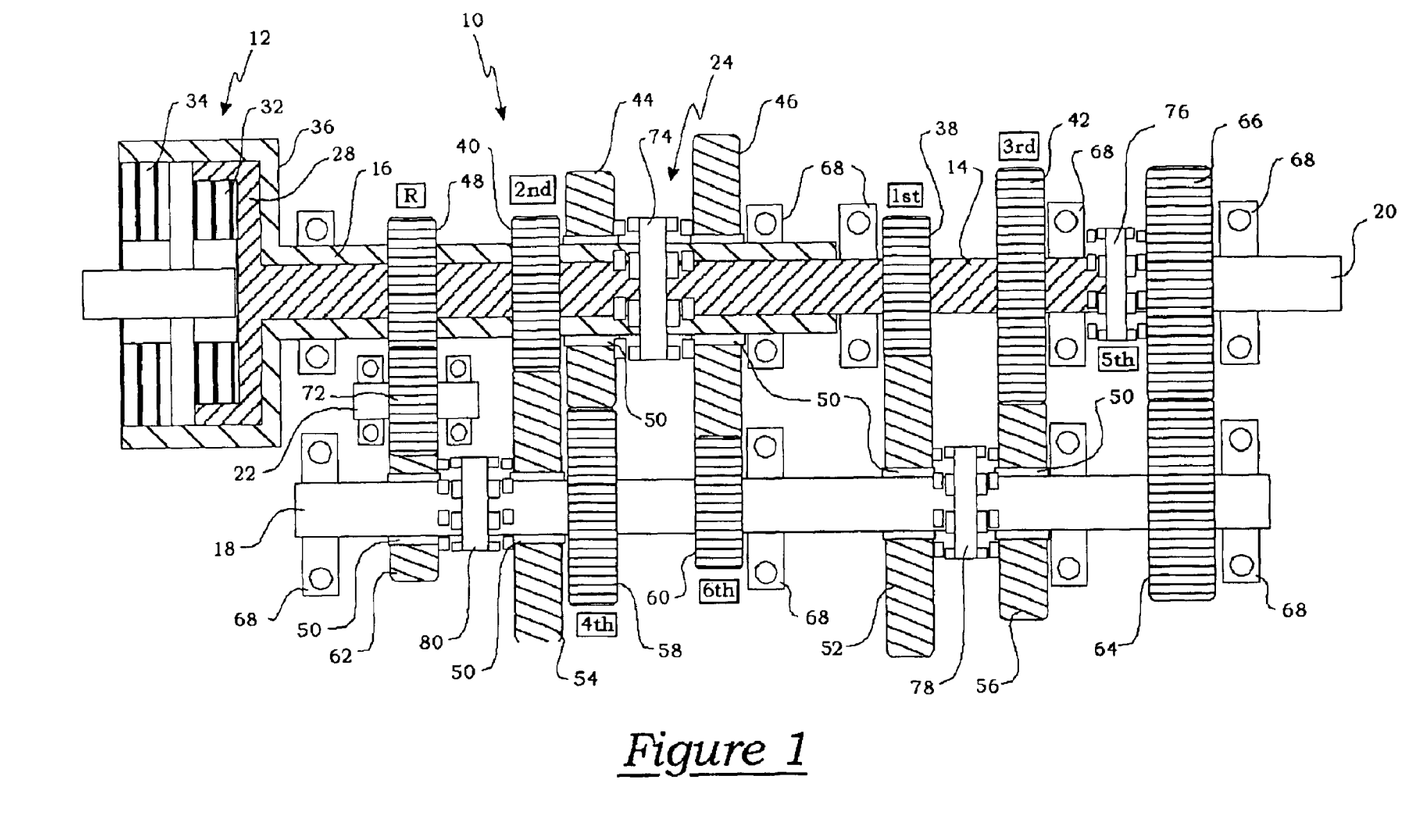
FIG. 1 is a generalized schematic illustration of a dual clutch transmission that may be controlled by the method of the present invention.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, and a plurality of synchronizers, generally indicated at 24.

The dual clutch transmission 10 forms a portion of a vehicle powertrain and is responsible for taking a torque input from a prime mover, such as an internal combustion engine and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacting with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators (not shown) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly disposed on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly retained on the output shaft 20. The output shaft 20 extends outward from the transmission 10 to provide an attachment for the remainder of the powertrain.

In the preferred embodiment, the reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gear 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that they are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its shaft when moved off of a center neutralized position to the right and engage another gear to its shaft when moved to the left.

It should be appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions. Thus, the control method of the present invention as described below may be a standalone process or merely a portion, such as a sub-routine, or series of sub-routines, of a larger control scheme within the ECU.

The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as best shown in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches and the resultant engine speed. Of particular concern to this application is the speed control routine that causes the engine speed to track a predetermined target speed for given input parameters by varying the applied engagement pressure across the clutch discs. In that regard, the actuating components of the first and second clutch mechanisms 32 and 34 are not shown and it should be appreciated there may be of any number of suitable known devices that are capable of selectively varying the applied engagement pressure between the clutch discs, such as, but not limited to mechanical actuators, hydro-mechanical actuators, electro-mechanical actuators, or fully electrical actuators.

For example, in one embodiment of the dual clutch transmission 10, the first and second clutch mechanisms 32 and 34 of the dual, coaxial clutch assembly 12 are actuated by hydraulic pressure supplied by the first and second clutch actuator valves, respectively. The clutch actuator valves are schematically represented, and generally indicated at 120 and 122 in FIG. 2, and as shown, are supplied with pressurized hydraulic fluid by a regulating circuit generally indicated at 82. It should be appreciated that, as previously mentioned, the actuation of the components of the dual clutch transmission 10 may be electrical rather than electro-hydraulic, and in that case, the first and second clutch actuator valves 120, 122 would be replaced by some type of physical drive devices to operatively engage the first and second clutch mechanisms 32 and 34.

Figure 2:
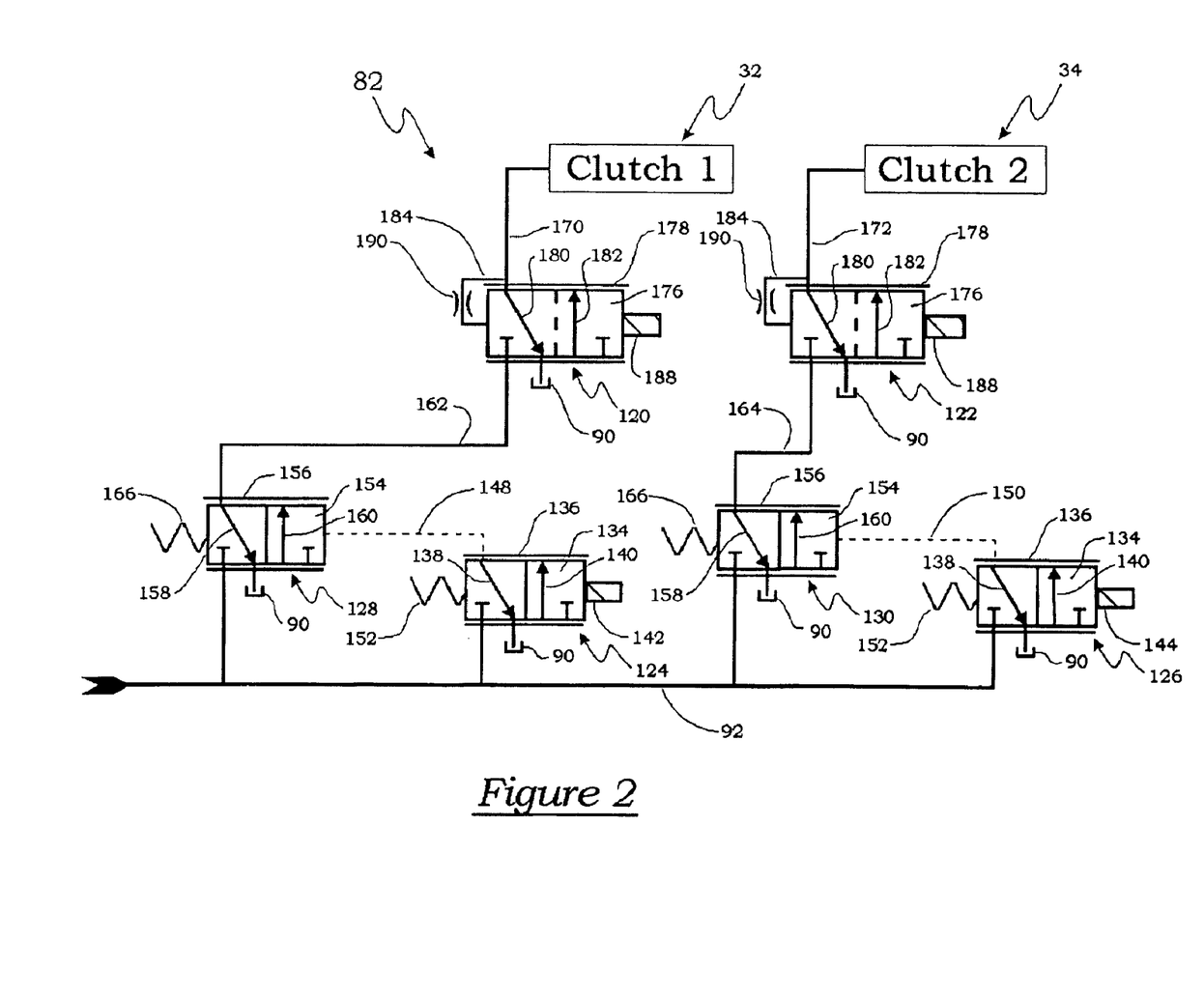
FIG. 2 is a schematic illustration of the electro-hydraulic control circuit for the clutch actuators of a dual clutch transmission that may be controlled by the method of the present invention.

As shown in FIG. 2, for this example of a dual clutch transmission 10, there are two on/off solenoids, generally indicated at 124 and 126, and two enable valves, generally indicated at 128 and 130 that provide the operative hydraulic pressure to the clutch actuator valves 120 and 122. A main pressure supply line 92 that is operatively connected to a source of pressurized hydraulic fluid from a pump within the transmission 10 (not shown) provides the two on/off solenoids 124 and 126 with pressurized hydraulic fluid. The on/off solenoids 124 and 126 each have a selectively movable valve member 134 disposed within a valve body 136 that has internal hydraulic flow passages 138 and 140. When energized, the valve members 134 of the on/off solenoids 124 and 126 are driven to the left, as illustrated, by actuators 142 and 144 respectively. The on/off solenoids 124 and 126 then selectively provide hydraulic pressure though pressure lines 148 and 150 to act upon the right sides of enable valves 128 and 130, as illustrated in FIG. 2. In their normally de-energized state, biasing member 152 causes the valve member 134 to be driven back to the right and any residual pressure in pressure lines 148 or 150 is bled off and routed back to the fluid sump, shown at 90.

The enable valves 128 and 130 also each have a selectively movable valve member 154 disposed within a valve body 156 that has internal hydraulic flow passages 158 and 160. The applied hydraulic pressure from the on/off solenoids 124 and 126 act to push the valve members 154 of the enable valves 128 and 130 to the left to open the internal hydraulic passage 158 and provide hydraulic pressure to clutch actuator valve 120 and 122 through the pressure supply lines 160 and 162. In their normally de-energized state biasing member 166 causes the valve member 154 to be driven back to the right and any residual pressure in pressure lines 160 or 162 is bled off and routed back to the fluid sump, shown at 90.

Though beyond the scope of this invention and not shown here, the two enable valves 128 and 130 are also in fluid communication with, and hydraulically feed, the synchronizer actuator valves that drive the synchronizers 24 of the transmission 10 between their engaged and neutralized positions. Thus, it should be appreciated that two on/off solenoids 124 and 126, and two enable valves 128 and 130 also have other hydraulic switching functions within the transmission 10, such that the on/off solenoids 124 and 126 are selectively operable to provide and remove hydraulic actuating pressure and prevent uncontrolled actuation of the mechanisms within the transmission 10.

When the on/off solenoids 124 and 126 are actuated and the enable valves 128 and 130 have charged the pressure supply lines 162 and 164 to the clutch actuator solenoids 120 and 122, the first and second clutch mechanisms, generally indicated at 32 and 34, are controllable. The clutch actuator valves 120 and 122 are in fluid communication with the clutch mechanisms 32 and 34 through clutch pressure lines 170 and 172 respectively. Each of the clutch actuator solenoids 120 and 122 have a selectively movable valve member 176 disposed within a valve body 178 that has internal hydraulic flow passages 180 and 182. The clutch actuator valves 120 and 122 also have external hydraulic feedback passages 184. A solenoid 188 selectively drives the valve member 176 operatively from its de-energized position biased to the left as illustrated in FIG. 2 to its energized position which allows the flow of pressurized hydraulic fluid to flow through internal passage 182 out the clutch pressure line 170, 172 to the clutch 32, 34.

The clutch actuator valves 120 and 122 are current controlled, variable regulating valves, such that a given control current applied to solenoids 188 will result in a particular pressure output in the clutch pressure lines 170, 172. Regulation of the clutch actuator valves 120, 122 is further provided by the pressure feedback through passages 184. Similar to the on/off solenoids 124 and 126 and the enable valves 128 and 130, the clutch actuator valves 120 and 122 have internal passages 180 to send residual pressure from the clutch pressure lines 170 and 172 back to the sump 90 when the solenoid is de-energized.

Figure 3:
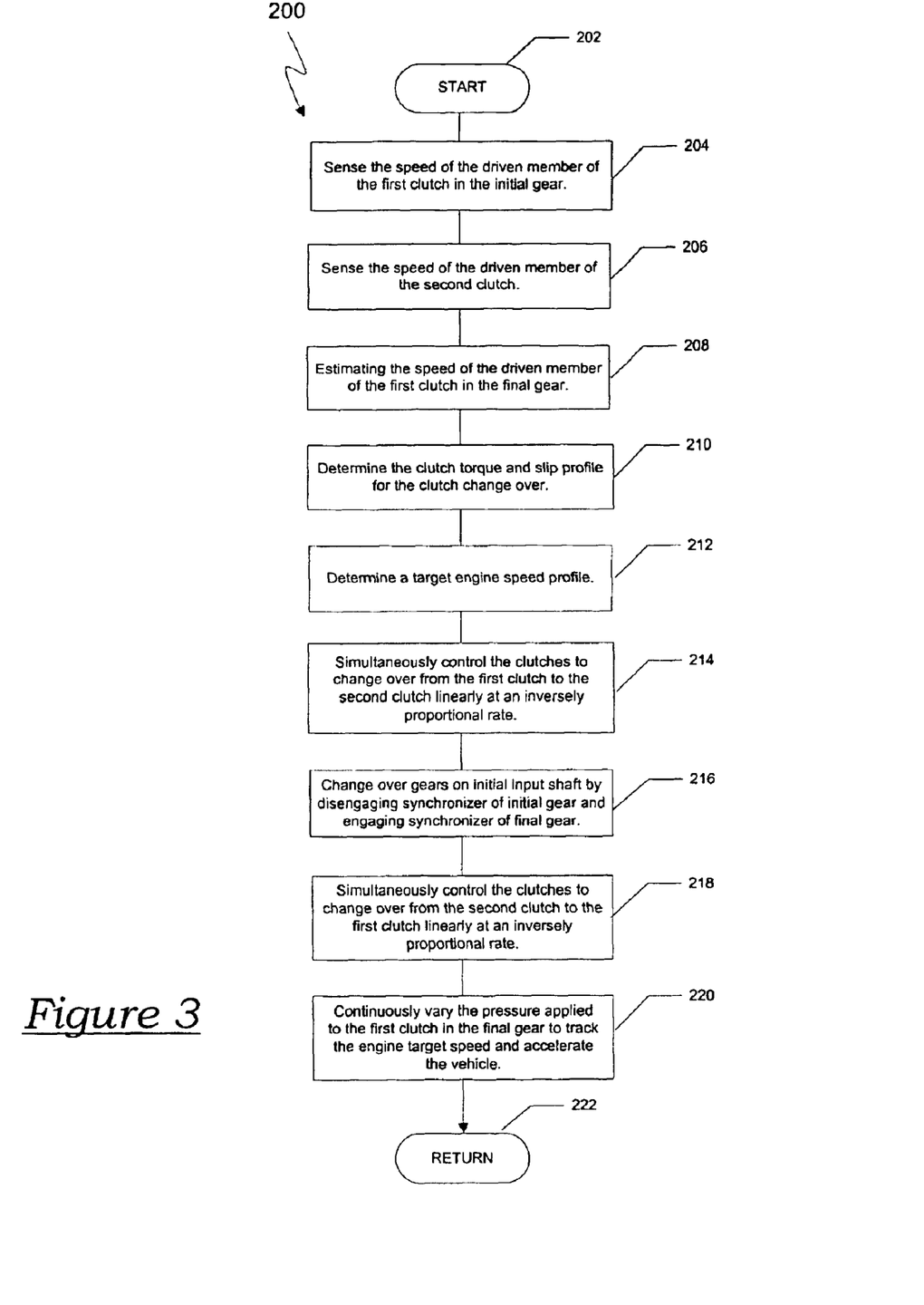
FIG. 3 is a block diagram flowchart of the method of the present invention for controlling a dual clutch transmission during a two-gear positive torque downshift event.

The method of the present invention is generally indicated at 200 in FIG. 3 and controls the torque transferred across each of the two clutches of a dual clutch transmission during a two-gear positive torque downshift, wherein the first of the two clutches provides the motive force for the initial off-going gear (sixth gear, in this example) and the final on-coming gear (fourth gear) and the second of the two clutches providing motive force for the intermediate gear (fifth gear). Thus, the method operatively controls the shifting process by controlling the torque transfer across the clutches 32 and 34 of the dual clutch transmission 10 for a two-gear positive torque downshift.

In operation, once the ECU, or other control device, makes a determination (by some other set of control parameters beyond the scope of this invention) that a two-gear positive torque downshift is required, the method of the present invention is initiated. The method begins at the start entry block 202 and continues by sensing the speed of the driven member of the first clutch for the initial gear (sixth gear in this example) at process block 204, sensing the speed of the driven member of the second clutch for the intermediate gear (fifth) at process block 206, estimating the speed of the driven member of the first clutch for the final gear (fourth) at process block 208, and determining the desired clutch torque/slip profile for the changeover of clutches during the shift at process block 210.

The determination of the desired clutch torque/slip profile is based on the application of any one of a variety of torque/slip profiles, which may be maintained in a lookup table or otherwise stored in accessible memory within an ECU. These torque/slip profiles are predetermined and are mathematically expressed as the change in clutch torque and slip over time. Different profiles may be used in different situations and for different gear changes. The profiles are derived based on the general shift "feel" that is desired. However, it has been determined that the most desirable clutch torque/slip profile for the dual clutch transmission is the one which provides a linear ramp up and ramp down of the respective clutches. The linear profile provides a smooth and efficient transition from the first clutch to the second clutch and back to the first clutch for the two-gear positive torque downshift.

A target engine speed profile is then determined at process block 212 based on the speed of the driven member of the first clutch, the speed of the driven member of the second clutch, the estimated the speed of the driven member of the first clutch for the final gear, and the desired clutch torque/slip profile. At process block 214 the method then simultaneously controls the torque transfer across each clutch so that the torque output of the transmission will be changed over from the first clutch to the second clutch and back to the first clutch. This occurs by linearly decreasing the torque transferred across the first clutch while linearly increasing the torque transferred across the second clutch in an inversely proportional rate to follow the clutch torque and slip profile (process block 210). This causes the engine to begin to track the target engine speed profile determined at process block 212.

As the engine tracks the target speed and the first clutch is slipping at a greater rate than the second clutch, the gears on the initial (even) input shaft are changed over. More specifically, on the even input shaft, the synchronizer of the initial (sixth) gear is disengaged and the synchronizer of the final (fourth) gear is engaged at process block 216. Then, the method simultaneously controls the torque transfer across each clutch so that the torque transferred across the second clutch is linearly decreased while linearly increasing the torque transferred across the first clutch in an inversely proportional rate to continue to follow the clutch torque and slip profile at process block 218. In other words, as each clutch is controlled independently, the total torque is linearly apportioned between each clutch during the two changeovers.

Notably, during the first and second clutch changeover from the initial gear to the intermediate gear the second clutch is not taken to full engagement. It merely passes a sufficient amount of torque to allow the engine to continue to track the target speed until the gear changeover on the even input shaft can occur. In this manner, the method of the present invention avoids the shifting harshness caused by fully engaging the intermediate gear as in conventional two-gear positive torque downshift events. Thus, the two-gear positive torque downshift of the present invention occurs smoothly and efficiently. The method continues at process block 220, in which the pressure applied to the first clutch is continuously varied once the first clutch is driving the final gear and is transferring all of the output torque to cause the engine to continue to track the target engine speed profile so that vehicle acceleration is maintained. Thus, with the shift event completed, the vehicle acceleration is smoothly maintained at process step 220. Then, the method of the present invention exits its control routine at step 222 and returns the ECU to other control routines.

When discussing a target engine speed profile that is used to control the engagement of the clutches to regulate the speed of the engine, and thus the vehicle during the shift, the term "target engine speed" and its associated concepts may take on a number of connotations in common practice and the terminology used here should be clearly understood. In general use, the phrase "target engine speed" may be used in an "engine speed control" scheme or strategy. The term "engine speed control" as used herein means holding the engine to a specific speed (RPM), or limiting the engine to a specific speed, or controlling the engine speed (and thus, its acceleration) over its operating range. Thus, engine speed control using a target engine speed may use a target that is either a static point, or involve dynamic control. In this case, during the shift activity of the transmission, the method of the present invention provides target engine speeds that are in actuality constantly changing, or dynamic. Target engine speed profiles are based on the clutch speeds and the desired slip across the clutches. Thus, the engine speed is caused to track the target engine speed profile by the control of the torque transfer across the clutches of the dual clutch transmission.

Figure 4:
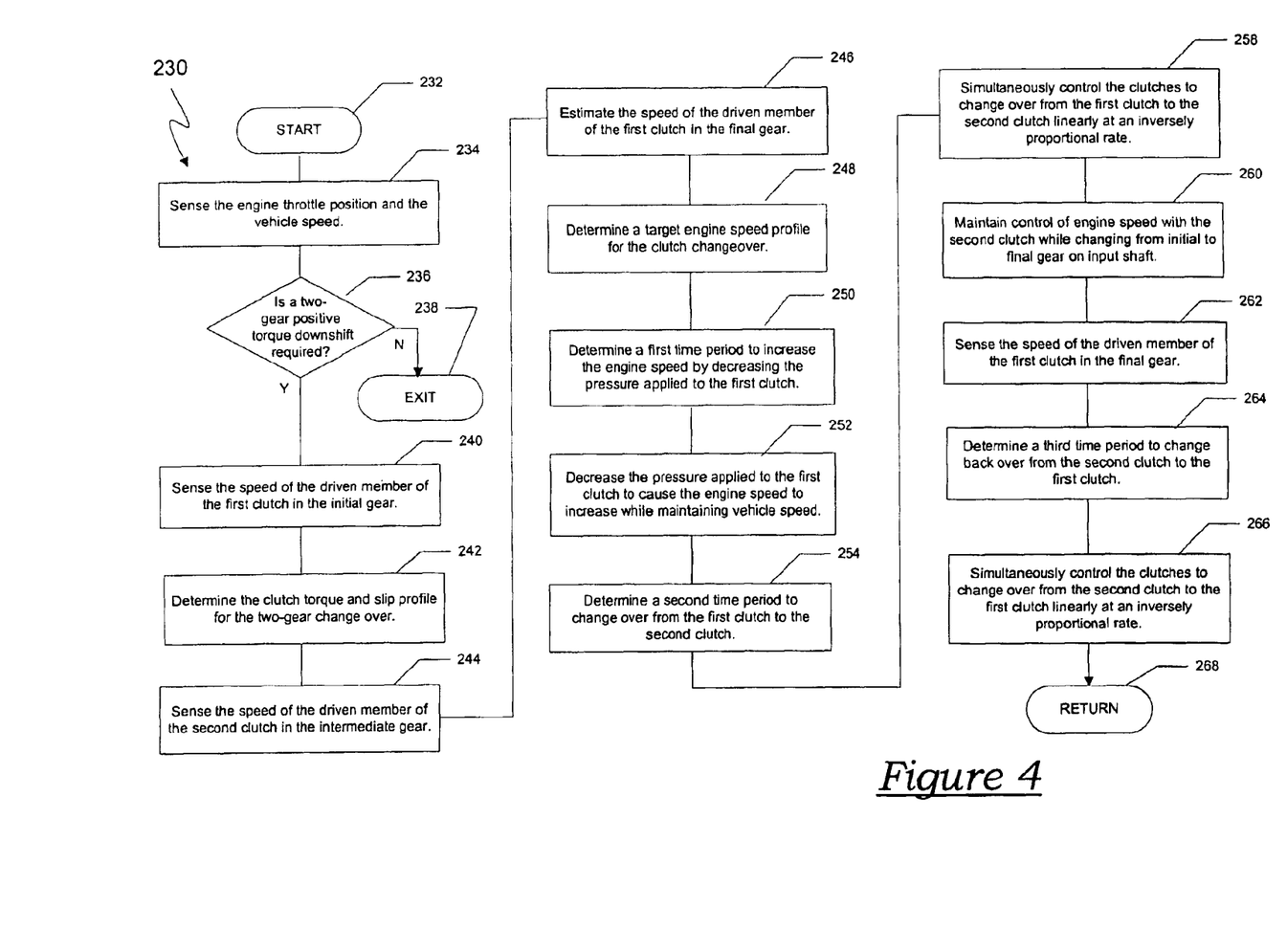
FIG. 4 is a detailed block diagram flowchart of the method of the present invention for controlling a dual clutch transmission during a two-gear positive torque downshift event.

More specifically, and by way of non-limiting example, the method steps generally indicated in FIG. 3 may include those depicted in detail in FIG. 4. As previously mentioned, a positive torque downshift will most likely occur in a vehicle "accelerate to pass" condition. This is where the engine throttle position is set to cause the engine and vehicle to accelerate or maintain a speed but it is desirable to rapidly accelerate to pass another vehicle. In this case, the engine throttle position will likely be maximized causing a commanded downshift to the next lower gear in an attempt to immediately increase the engine speed to place it in a higher torque generating RPM range. In the following method steps, generally indicated at 230 in FIG. 4, an external determination has been made that a positive torque downshift is required and the method determines if it must be a two-gear downshift. It should be appreciated that this two-gear downshift determination may also be made externally to the method of the present invention as discussed in relation to the steps of FIG. 3.

The method 230 begins at the start entry block 232 as the ECU or other controlling device has determined that a positive torque downshift is commanded and continues to process block 234, which senses the engine throttle position and the vehicle speed. At decision block 236, a determination is made if a two-gear positive torque downshift is required, based on the sensed engine throttle position and the vehicle speed. It should be appreciated that in decision block 236 the ECU applies values that relate the current vehicle speed and the engine throttle position to a predetermined set of parameters to determine if the two-gear shift is necessary. The parameters may include the position of the throttle in relation to its maximum, the speed at which the throttle position has been changed, or the difference between the estimated vehicle speed for the new throttle position and the current vehicle speed, for example. Regardless, the predetermined parameters that determine if the two-gear downshift is necessary may vary and are chosen relative to the desire to allow the vehicle to heavily downshift and rapidly accelerate when it appears that the operator is requesting such as response. It should be further appreciated that other factors such as vehicle weight and engine power may also be figured into the predetermined parameters, which are highly dependant on the particular application.

If the predetermined set of parameters is met such that a two-gear positive torque downshift is necessary, then the "Yes" path is followed to process block 240. If it is determined that a two-gear positive torque downshift is not necessary at decision block 236, then the "No" path is followed and the method of the present invention ends at exit block 238. In this case, since it has already been determined that a single gear positive downshift is required, it should be appreciated that the ECU will take the exit back to another positive torque downshifting method that lies beyond the scope of the present invention.

In continuing the method steps of the present invention, process block 240 senses the speed of the driven member of the first clutch driving the initial gear (sixth). Process block 242 then determines the desired clutch torque/slip profile for the changeover of clutches during the shift. Process block 244 then senses the speed of the driven member of the second clutch for the intermediate gear (fifth) and process block 246 estimates the speed of the driven member of the first clutch for the final gear (fourth). These values (from blocks 240, 242, 244, and 246) are used at process block 248 to determine a target engine speed profile. Once the target engine speed profile is determined, a first time period is determined based on the speed of the driven member of the first clutch (process block 240) and the speed of the driven member of the second clutch for the intermediate gear (process block 244) at process block 250. The first time period allows the engine speed to increase to the point at which the torque transfer of both the first and second clutch can be changed from one clutch to the other. Then at process block 252, after the determination of the target engine speed and the first time period, the pressure applied to the first clutch is decreased and the engine speed is caused to increase and begin to track the target engine speed. As the engine begins to track the target engine speed, process block 254 determines a second time period during which the torque output of the transmission will be changed over from the first clutch to the second clutch based on the clutch speeds and the clutch torque and slip profile.

Then the torque transfer across each clutch is simultaneously controlled so that the torque transferred across the first clutch is linearly decreased while the torque transferred across the second clutch is linearly increased at an inversely proportional rate to follow the clutch torque and slip profile (process block 242) and to cause the engine to continue to track the target engine speed profile (process block 250) during the second time period (process block 254) at process block 258. The speed of the engine is controlled by the pressure on the second clutch as the pressure on the first clutch has been reduced to the point where the initial gear is disengaged and the final gear is engaged on the even input shaft at process block 260. Process block 262 then senses the speed across the driven member of the first clutch in the final gear, so that a third time period can be determined at process block 264. During the third time period the torque output of the transmission will be changed back over from the second clutch in the intermediate gear, to the first clutch in the final gear, based on the clutch speeds and the clutch torque and slip profile previously determined. Then, the torque transfer across each clutch is simultaneously controlled so that the torque transferred across the second clutch is linearly decreased while the torque transferred across the first clutch is linearly increased at an inversely proportional rate to follow the clutch torque and slip profile (process block 242) and to cause the engine to continue to track the target engine speed profile (process block 250) during the third time period (process block 264) at process block 266. When these steps are completed and the vehicle is accelerating in the final gear, the method of the present invention exits at step 268.

Figure 5:
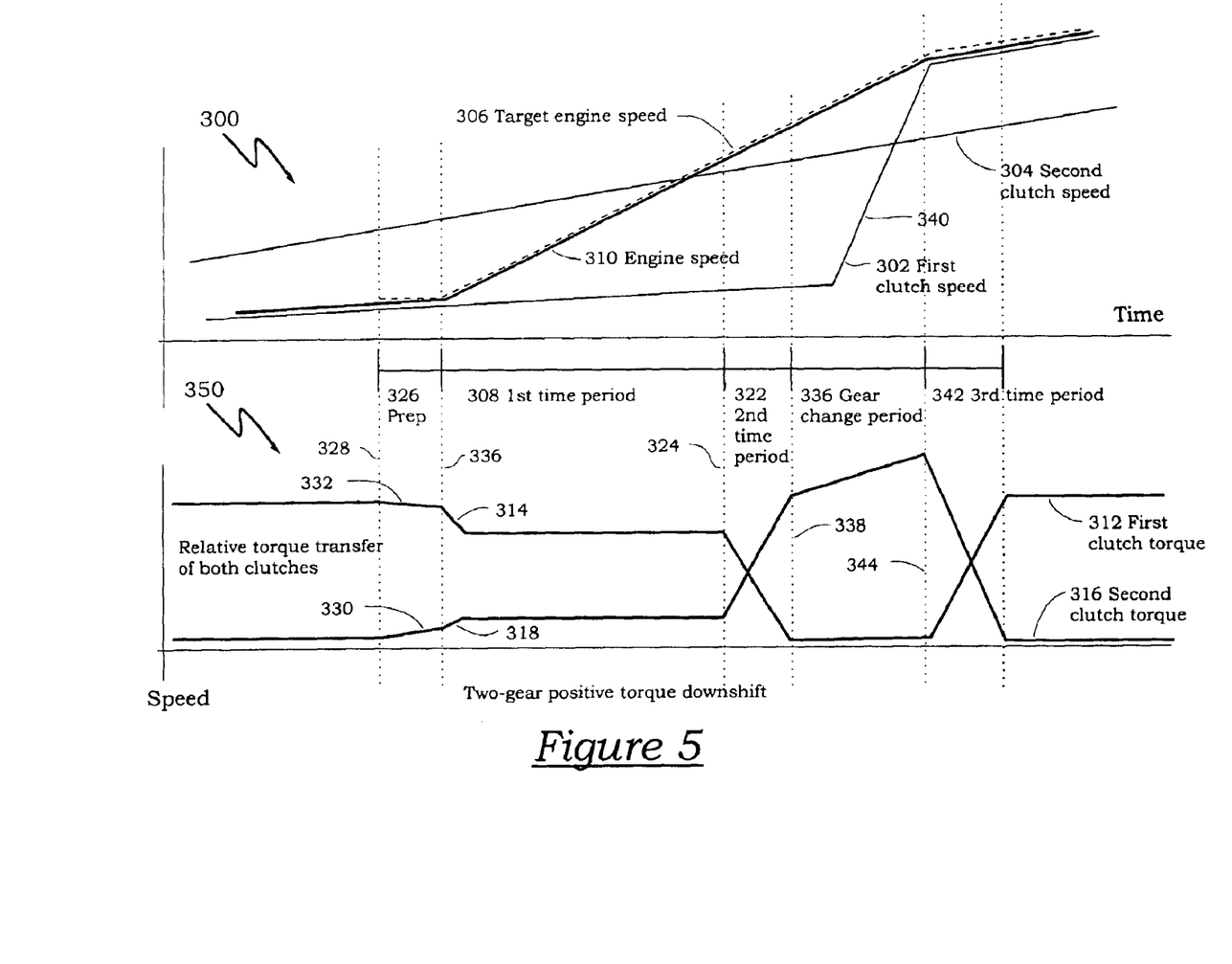
FIG. 5 is a representative graph of the method of the present invention for controlling a dual clutch transmission of the engine speed and clutch torque transfer over time during a two-gear positive torque downshift event.

The method of the present invention and its interrelation to the control of the torque transfer across the two clutches of the dual clutch transmission during the two-gear positive torque downshift event is graphically illustrated in FIG. 5. A graph of the relative speeds of the two clutches versus a relative time line is generally indicated at 300 and a graph of the relative level of torque transfer of the two clutches versus the same relative time scale is generally indicated at 350. In the two-gear positive torque downshift, as described above, the generally increasing speed of the first clutch is shown as line 302 and the generally increasing but much higher relative speed of the second clutch is shown as line 304. The two-gear positive torque downshift will cause the delivery of the output torque of the engine to be changed over from the first clutch driving the higher initial gear to the second clutch driving the intermediate (next lower) gear and back to the first clutch after the change over to the final gear. Therefore, as the target engine speed profile at 306 and the first time period at 308 are determined (process blocks 248 and 250, FIG. 4), the engine speed 310 is caused to begin to track the target engine speed profile 306. This occurs as the pressure applied to the first clutch is decreased (process block 252, FIG. 4) thereby allowing the engine speed to increase, when the pressure applied to the second clutch is increased a small predetermined amount to aid in controlling the engine speed and to increase the speed on the second clutch. These changes are shown by the linear change to the first clutch torque line 312 at 314 and the change to the second clutch torque line 316 at 318 (FIG. 5) during the first time period 308.

The second time period 322 (process block 254, FIG. 4), which begins at vertical line 324 provides the simultaneous control of the torque transfer across each clutch so that the torque output of the transmission will be changed over from the first clutch to the second clutch by linearly decreasing the torque transferred across the first clutch while linearly increasing the torque transferred across the second clutch in an inversely proportional rate. This control of the clutches follow the clutch torque and slip profile and to cause the engine to track the target engine speed profile. This is illustrated by the change in the first and second clutch torque lines 312 and 316 of 350 (FIG. 5) during the second time period 322. As the second clutch in the intermediate gear is brought on, the engine speed continues to increase and further track the target engine speed profile in a continued rise without interruption. Thus, the vehicle continues to accelerate smoothly as the torque transfer is moved to the intermediate gear.

It should be appreciated that prior to the two-gear positive torque downshift event, a preparatory portion of the shift event must be accomplished. Thus, the method of the present invention provides for the additional steps of performing a preparatory clutch pressure fill without a transfer of torque to the second clutch and performing a predetermined nominal reduction in the pressure applied to the first clutch to cause a slight slip in preparation of disengaging the first clutch. These preparatory steps occur immediately prior to the first time period 308. As shown in FIG. 5, the preparatory steps occur in the preparatory period 326, which starts at vertical line 328 with the pressure fill of the second clutch at 330 and the nominal reduction of pressure to the first clutch at 332. It continues until the beginning of the first time period 308 at vertical line 334. A preparatory period is not required during the later change back to the first clutch since the first clutch never fully reduces its torque transfer to zero.

During the gear change over period 336, shown beginning at vertical line 338, the engine speed is controlled by the increasing torque transferred across the second clutch in the intermediate gear as the torque transfer across the first clutch is minimized. It is also during this time period that the synchronizer of the initial gear is disengaged and the synchronizer of the final gear is engaged (process block 260, FIG. 4). The speed of the first clutch can be seen increasing at 340 as the changeover to the final gear occurs and the clutch begins spinning faster in response to the change to a smaller (i.e. final) gear. As the speed of the first clutch in the final gear rises to meet the target engine speed 306, the third time period 342 (process block 264, FIG. 4) begins at vertical line 344. During the third time period 342, the second simultaneous linear clutch change over takes place (process block 266), which is illustrated by the change in the first and second clutch torque lines 312 and 316 of 350 (FIG. 5). As the first clutch in the final gear is brought on, and the torque transfer across the second clutch is reduced, the engine speed begins to level off at the end of the third time period 342 shown at vertical line 346, but continues to increase so that the vehicle continues to smoothly accelerate now in the final gear. It should be appreciated that in providing a two-gear positive torque downshift, the method of the present invention avoids a full shift from the initial gear into the intermediate gear and then full second shift from the intermediate gear to the final gear.

Therefore, the method of the present invention overcomes the drawbacks and disadvantages of all prior dual clutch transmission shift control methods by providing smooth and efficient shifting of the dual clutch transmission in two-gear positive downshift events. The method of the present invention provides two linear and inversely proportional changeovers from the first clutch to the second clutch and back to the first clutch without fully engaging the second. This improves overall drivability and comfort of the vehicle when compared with prior methods, which use a non-linear changeover of the clutches that cause uncontrolled changes in engine and vehicle speed that results in inefficient torque transfer and poor ride characteristics during the shift.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A method of controlling torque transferred across each of the two clutches of a dual clutch transmission during a two-gear positive downshift, wherein the first of the two clutches drives an initial gear and the final gear and the second of the two clutches drives an intermediate gear, said method including the steps of:

sensing the speed of a driven member of the first clutch in the initial gear;

sensing the speed of a driven member of the second clutch in the intermediate gear;

estimating the speed of a driven member of the first clutch in the final gear;

determining a desired clutch torque and slip profile for the changeover of the clutches;

determining a target engine speed profile based on the speed of the driven member of the first clutch, the speed of the driven member of the second clutch, the estimated speed of the driven member of the first clutch for the final gear, and the desired clutch torque and slip profile;

simultaneously controlling the torque transfer across each clutch so that torque output of the transmission will be changed over from the first clutch to the second clutch by linearly decreasing the torque transferred across the first clutch while linearly increasing the torque transferred across the second clutch in an inversely proportional rate to follow the clutch torque and slip profile and to cause the engine to track the target engine speed profile;

change over the gears driven by the first clutch by disengaging a synchronizer of the initial gear and engaging a synchronizer of the final gear as the engine tracks the engine speed profile and the first clutch is slipping at a greater rate than the second clutch;

simultaneously controlling the torque transfer across each clutch so that the torque output of the transmission will be changed back from the second clutch to the first clutch by linearly decreasing the torque transferred across the second clutch while linearly increasing the torque transferred across the first clutch in an inversely proportional rate to continue to follow the desired clutch torque and slip profile and to cause the engine to continue to track the target engine speed profile; and continuously varying pressure applied to the first clutch to cause the engine to continue to track the target engine speed profile so that vehicle acceleration is maintained once the first clutch is driving the final gear and is transferring all of the output torque.

2. The method as set forth in claim 1 further including the steps of:

determining a first time period during which the engine speed will be increased by decreasing the pressure applied to the first clutch based on the speed of the first clutch and the speed of the driven member of the second clutch; and decreasing the pressure applied to the first clutch and increasing pressure applied to the second clutch during the first time period to cause the engine speed to increase and track the target engine speed profile so that the torque output can be changed from the from initial gear to the intermediate gear while maintaining the increasing vehicle acceleration.

3. The method as set forth in claim 1 further including the step of determining a second time period during which the torque transfer across each clutch will be changed over from the first clutch to the second clutch.

4. The method as set forth in claim 1 further including the steps of:

sensing the speed of the driven member of the first clutch after the change over to the final gear; and determining a third time period during which the torque transfer across each clutch will be changed over from the second clutch to the first clutch.

5. A method of controlling torque transferred across each of the two clutches of a dual clutch transmission during a positive downshift, wherein the first of the two clutches drives an initial gear and the final gear and the second of the two clutches drives an intermediate gear, said method including the steps of:

sensing engine throttle position and vehicle speed;

determining if a two-gear positive downshift is required based on the engine throttle position and the vehicle speed;

sensing the speed of a driven member of the first clutch in the initial gear;

determining a desired clutch torque and slip profile for the changeover of the clutches;

sensing the speed of a driven member of the second clutch in the intermediate gear;

estimating the speed of the driven member of the first clutch in the final gear;

determining a target engine speed profile based on the speed of the driven member of the first clutch, the speed of the driven member of the second clutch, the estimated speed of the driven member of the first clutch for the final gear, and the desired clutch torque and slip profile;

determining a first time period during which the engine speed will be increased by decreasing pressure applied to the first clutch based on the speed of the first clutch and the speed of the driven member of the second clutch;

decreasing the pressure applied to the first clutch and increasing pressure applied to the second clutch during the first time period to cause the engine speed to increase and track the target engine speed profile so that torque output of the transmission can be changed from the initial gear to the intermediate gear while maintaining the increasing vehicle speed;

determining a second time period during which the torque transfer across each clutch will be changed over from the first clutch to the second clutch;

simultaneously controlling the torque transfer across each clutch so that the torque output of the transmission will be changed over from the first clutch to the second clutch by linearly decreasing the torque transferred across the first clutch while linearly increasing the torque transferred across the second clutch in an inversely proportional rate to follow the desired clutch torque and slip profile and to cause the engine to track the target engine speed profile;

disengaging a synchronizer of the initial gear and engaging a synchronizer of the final gear as the engine tracks the target engine profile speed profile and the first clutch is slipping at a greater rate than the second clutch to change over the gears driven by the first clutch;

sensing the speed of the driven member of the first clutch after the change over to the final gear;

determining a third time period during which the torque transfer across each clutch will be changed over from the second clutch to the first clutch; and simultaneously controlling the torque transfer across each clutch so that the torque output of the transmission will be changed back from the second clutch to the first clutch by linearly decreasing the torque transferred across the second clutch while linearly increasing the torque transferred across the first clutch in an inversely proportional rate to continue to follow the desired clutch torque and slip profile and to cause the engine to continue to track the target engine speed profile.

* * * * *